United States Patent [19]

Furukawa

[11] Patent Number: 5,218,896
[45] Date of Patent: Jun. 15, 1993

[54] DRIVING MECHANISM WITH GAS BEARING

[75] Inventor: Motomu Furukawa, Kawasaki, Japan

[73] Assignee: Canon Kabushiki Kaisha, Tokyo, Japan

[21] Appl. No.: 888,277

[22] Filed: May 26, 1992

Related U.S. Application Data

[63] Continuation of Ser. No. 391,718, Aug. 7, 1989, abandoned, which is a continuation of Ser. No. 115,865, Nov. 2, 1987, abandoned.

[30] Foreign Application Priority Data

Nov. 6, 1986 [JP] Japan .................. 61-262853
Jul. 30, 1987 [JP] Japan .................. 62-191949

[51] Int. Cl.$^5$ .............. F15B 11/08; F01B 31/10; F16C 32/06
[52] U.S. Cl. ...................... 91/419; 92/153; 92/DIG. 2; 384/12
[58] Field of Search ............... 91/196, 216 A, 216 B, 91/216 R, 299, 317, 318, 419; 92/117 A, 117 R, 146, 161, 153; 384/12, 13, 15, 100, 902, 16, 119

[56] References Cited

U.S. PATENT DOCUMENTS

| | | | |
|---|---|---|---|
| 2,987,886 | 6/1961 | Deering et al. | 91/318 |
| 3,076,523 | 2/1963 | Fuller et al. | 92/DIG. 2 |
| 3,168,013 | 2/1965 | Williamson | 92/DIG. 2 |
| 3,663,071 | 5/1972 | Kates | 92/162 |
| 3,744,858 | 7/1973 | Weichsel | 384/12 |
| 3,777,621 | 12/1973 | Blok et al. | 92/162 R X |
| 4,020,744 | 5/1977 | Swenson | 91/216 B |
| 4,026,193 | 5/1977 | Olmsted | 91/216 B |
| 4,164,264 | 8/1979 | Fair | 91/216 B |
| 4,245,844 | 1/1981 | Pohl et al. | 277/DIG. 1 |
| 4,388,981 | 6/1983 | Fair | 91/216 B |
| 4,644,848 | 2/1987 | McKendrick | 91/419 |
| 4,699,043 | 10/1987 | Violante De Dionigi | 92/146 X |
| 4,718,329 | 1/1988 | Nakajima et al. | 91/445 |
| 4,726,689 | 2/1988 | Pollock | 384/12 |
| 4,749,283 | 7/1988 | Yokomatsu et al. | 384/12 |
| 4,813,339 | 3/1989 | Uno et al. | 91/443 X |
| 4,872,360 | 10/1989 | Lew et al. | 92/117 A X |
| 4,889,039 | 12/1989 | Miller | 92/162 R X |

FOREIGN PATENT DOCUMENTS 134622 10/1981 Japan .................. 384/12

Primary Examiner—Edward K. Look
Assistant Examiner—John Ryznic
Attorney, Agent, or Firm—Fitzpatrick, Cella, Harper & Scinto

[57] ABSTRACT

A driving mechanism usable in an electron beam exposure apparatus, X-ray exposure apparatus, ion beam exposure apparatus, evaporation apparatus, chemical vapor deposition apparatus or otherwise, for rectilinearly moving a wafer carrying stage in a vacuum chamber is disclosed. The mechanism includes a guide shaft, a partition flange fixed to the guide shaft, a pair of bearing assemblies slidably mounted to the guide shaft and disposed on the opposite sides of the flange, a coupling barrel for coupling the paired bearing assemblies and covering the guide shaft portion between the bearing assemblies, and a fluid supplying system for supplying fluids to the opposite sides of the partition flange. With this structure, the stage can be moved rectilinearly by controlling the fluid pressures on the opposite sides of the flange, while retaining high vacuum in the vacuum chamber.

6 Claims, 2 Drawing Sheets

DRIVING MECHANISM WITH GAS BEARING

This application is a continuation of application Ser. No. 07/391,718 filed Aug. 7, 1989, which is a continuation of application Ser. No. 07/115,865, filed Nov. 2, 1987, both now abandoned.

FIELD OF THE INVENTION AND RELATED ART

This invention relates to a driving mechanism for moving a movable member and, more particularly, to a driving mechanism for hydrostatically driving a movable member by use of a fluid pressure such as an air pressure or otherwise. The driving mechanism of the present invention is suitably usable for moving a workpiece carrying table such as a wafer stage carrying thereon a semiconductor wafer or the like which is to be processed in a vacuum ambience. Thus, the driving mechanism of the present invention is particularly suited for use in a semiconductor device manufacturing exposure apparatus such as an electron beam exposure apparatus, an X-ray exposure apparatus, an ion beam exposure apparatus or otherwise, an evaporation apparatus, a chemical vapor deposition (CVD) apparatus and so on.

Conventionally, a piston and cylinder mechanism is used to drive and move a wafer carrying stage in a vacuum chamber. In this case, a cylinder body is placed outside the vacuum chamber, while only a piston rod is movably disposed within the vacuum chamber. The boundary between the vacuum chamber and the piston rod is sealed by use of an O-ring seal. Alternatively, bellows or otherwise is used to cover and enclose the piston and cylinder mechanism as a whole so that the mechanism is placed in an atmospheric pressure. However, where an O-ring seal is used to seal the boundary between the vacuum chamber and the piston rod, the durability is low because of the abrasion of the O-ring seal. Also, the moving accuracy is easily degraded due to the friction. Where a bellows is used, there still remain inconveniences of poor durability and vibration of the bellows.

SUMMARY OF THE INVENTION

It is accordingly a primary object of the present invention to provide a driving mechanism which ensures high moving accuracy and high durability and which is very effective particularly when it is used with a movable stage that operates in a vacuum chamber.

In accordance with one aspect of the present invention, to achieve the above object, there is provided a driving mechanism wherein a pair of bearing assemblies are slidably mounted onto a guide shaft and the paired bearing assemblies are coupled to each other, by means of a barrel member covering a portion of the guide shaft, thereby to provide a stage driving unit. Two spaces which are substantially independent from each other are defined between the guide shaft and the barrel member, covering the guide shaft portion, and a fluid is supplied into these spaces to thereby displace the stage along the guide shaft.

With the arrangement of the present invention, it is unnecessary to provide a drive source, such as a cylinder, outside the vacuum chamber. The driving mechanism as a whole, together with the stage, can be placed within the vacuum chamber. Therefore, the stage device can be made compact. Further, the above-described inconveniences in relation to the sealing of the boundary between the vacuum chamber and the piston rod or the vibration of the bellows, can be avoided. Accordingly, a high vacuum pressure is attainable with increased durability and increased precision for control of the movement. Moreover, where the operative fluid is supplied into the two substantially independent spaces between the guide shaft and the coupling barrel member by way of passage means formed within the guide shaft, as in one preferred form of the present invention which will be described later, the number of tube passages to a movable structure (which comprises a pair of bearing assemblies and a barrel member coupling them) can be decreased with further advantages of suppressing the effect of piping arrangement and a resultant improvement in the accuracy of movement control.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Figure 1:
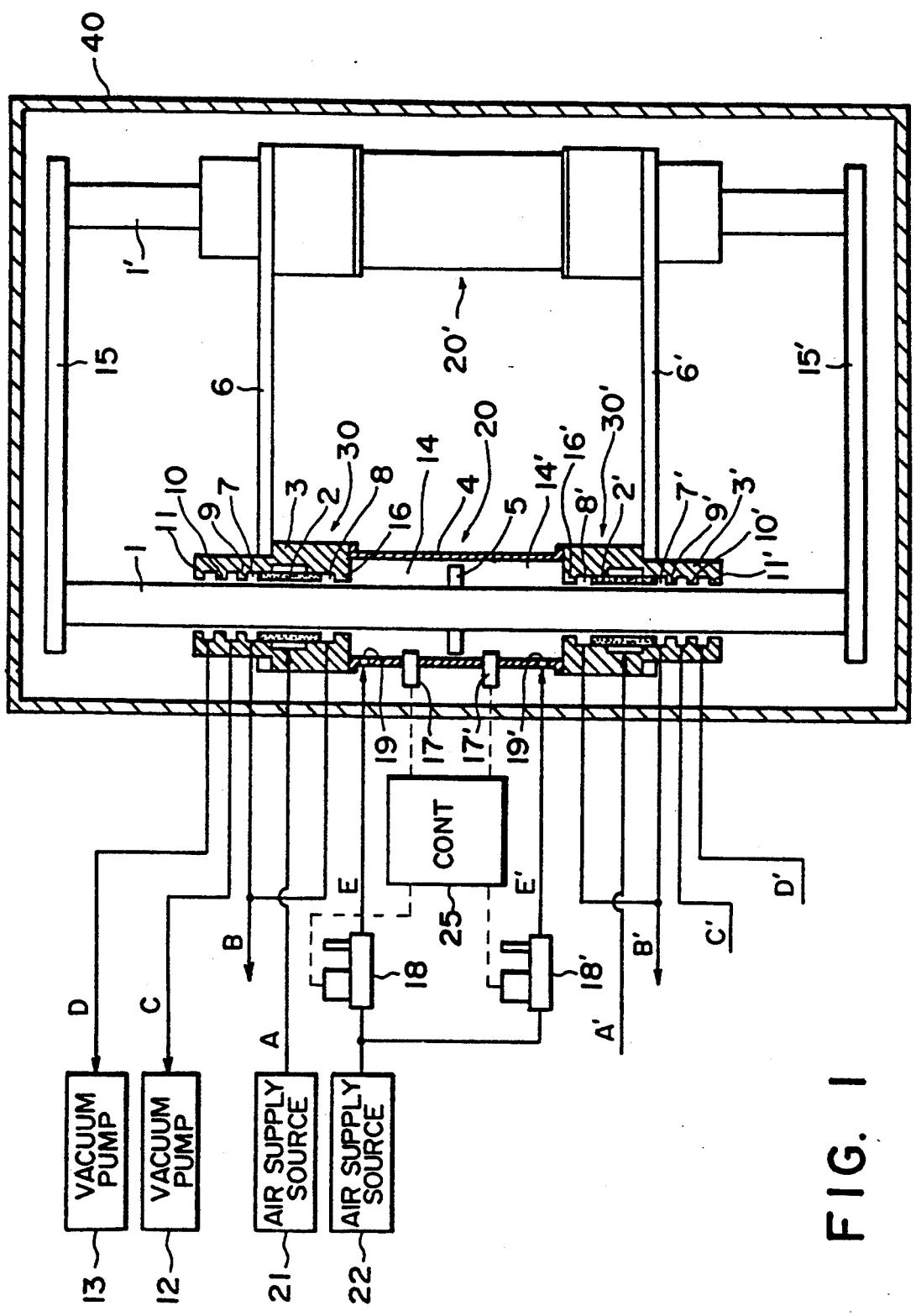
FIG. 1 is a schematic and diagrammatic view of a hydrostatic driving mechanism according to one embodiment of the present invention, wherein the driving mechanism is used to rectilinearly move a wafer carrying stage by use of a static pressure.

Referring first to FIG. 1, there is shown a hydrostatic driving mechanism according to a first embodiment of the present invention. The driving mechanism of the present embodiment is incorporated into a stage device wherein a workpiece carrying stage for carrying thereon a workpiece such as a semiconductor wafer is moved rectilinearly.

As shown in FIG. 1, there are provided two guide shafts 1 and 1' for guiding the rectilinear motion of the workpiece carrying stage (not shown). The guide shafts 1 and 1' have their ends fixed in a predetermined interrelation by means of coupling plates 15 and 15'. Denoted generally at 20 and 20' are driving units, respectively, each of which is movable while being guided by one of the corresponding guide shafts 1 and 1'. The driving units 20 and 20' are coupled to each other by means of coupling plates 6 and 6' so that they are movable integrally or "as a unit". A casing 40 defines a vacuum chamber in which the workpiece carrying stage (not shown), carrying thereon a workpiece (such as a wafer) to be processed, is movably placed. More particularly, the unshown work-piece carrying stage is supported by the driving units 20 and 20' and is moved with the driving units 20 and 20' in a direction as determined by the guiding by the guide shafts 1 and 1'. Since the driving units 20 and 20' have substantially the same structure, description will be made of the details of the driving unit 20, only, for the simplicity of explanation.

The driving unit 20 includes bearing sleeves 2 and 2' which are held by housings 3 and 3', respectively. Each of the bearing sleeves 2 and 2' is made of a porous material, with the advantages of high rigidity (bearing rigidity) and a reduced flow rate of air used. As seen in FIG.

1, the housings 3 and 3' each has a generally cylindrical shape and are coupled to each other by a coupling barrel 4 having a cylindrical shape. In this embodiment, the barrel 4 cooperates with the housings 3 and 3' and a portion of the guide shaft 1 surface to define a space between the guide shaft 1 and the inner cylindrical surface of the barrel 4. Fixedly provided on the guide shaft 1 is a flange 5. In the driving mechanism of the present embodiment, a pair of bearing assemblies 30 and 30' are slidably mounted to the guide shaft 1, on the opposite sides of the flange 5, as shown in FIG. 1. Each of the bearing assemblies 30 and 30' has a fluid bearing structure that comprises a bearing sleeve 2 (2') for discharging a fluid such as a pressurized air and a housing 3 (3') encircling the bearing sleeve. Further, at the inside surface of the housing 3 (3') opposed to the guide shaft 1 surface and at positions on the opposite sides of the bearing sleeve 2 (2') with respect to the axial direction of the guide shaft 1, there are formed fluid reservoirs 7 and 8 (7' and 8'). Additionally, at the inside surface of the housing 3 (3') opposed to the guide shaft 1 surface and adjacent the outer end of the housing, there are provided partitions 9, 10 and 11 (9', 10' and 11'), each being close to the guide shaft 1 surface. Vacuum pumps 12 and 13 are provided so as to evacuate minute spaces defined between these partitions. More particularly, the vacuum pump 12 is in fluid communication with a small space between the partitions 9 and 10 and a small space between the partitions 9' and 10', by way of passageways C and C'. On the other hand, the vacuum pump 13 is in fluid communication with a small space between the partitions 10 and 11 and a small space between the partitions 10' and 11' by way of passageways D and D', respectively. Each of the partitions 9-11 and 9'-11' has a minute clearance, of an order of a few microns, between it and the surface of the guide shaft 1, so as to provide a large flow passage resistance. As described hereinbefore, the housings 3 and 3' are coupled to each other by the coupling barrel 4. The coupling barrel 4 is effective to cover the portion of the guide shaft 1 located between the housings 3 and 3'. At this time, the inside space of the coupling barrel 4 is divided by the flange 5 which serves as a partition wall, whereby two substantially separated and independent air chambers are defined. Mounted to the coupling barrel 4 are pressure sensors 17 and 17' which are provided to detect the pressures within the air chambers 14 and 14', respectively, defined on the opposite sides of the flange 5. Also, the coupling barrel 4 is formed with air introducing ports 19 and 19' operable to introduce air into the air chambers 14 and 14', respectively, from a common air supply source 22 by way of respective passageways E and E'.

Servovalves 18 and 18' are provided in the passageways E and E', respectively, from the common air supply source 22. The servovalves 18 and 18' are electrically communicated with the pressure sensors 17 and 17', respectively, by way of a common control circuit 25. The coupling plates 6 and 6' which are contributable to drive the unshown workpiece carrying stage, as described hereinbefore, are fixed to the housings 3 and 3', respectively, each in a direction perpendicular to the axial direction of the guide shaft 1.

As seen in FIG. 1, the major portion of the stage driving mechanism, including the guide shafts 1 and 1', the driving units 20 and 20' mounted thereto and so on, is placed, together with the workpiece carrying stage (not shown), in the vacuum chamber as defined by the casing 40.

The operation of the driving mechanism of the structure described hereinbefore will now be explained.

When in operation pressurized air is supplied to the bearing assemblies 30 and 30' by way of respective passageways A and A' from a common air supply source 21 which is disposed outside the vacuum chamber, the supplied air is discharged from the bearing sleeves 2 and 2', respectively, toward the guide shaft 1 surface. By this, a fluid lubricating film is formed in a gap between each bearing sleeve 2 or 2' and the guide shaft 1 surface. The air thus forming the fluid lubricating films is effective to bear the load applied to the workpiece carrying stage and, thereafter, flow into the air reservoir 7 or 8 (7' or 8'). From each reservoir, the air flows through a corresponding one of passageways B and B' to the outside of the casing 40, which is at the atmospheric pressure. Since a large flow passage resistance is established by the partitions 9-11 (9'-11') formed at the end portion of the housing 3 (3') and also since the small spaces between these partitions are forcibly evacuated by the vacuum pumps 12 and 13 by way of respective passageways C, D, C' and D', only a very small amount of air will leak out into the vacuum chamber defined by the casing 40. Accordingly, the vacuum chamber in the casing 40 can be maintained at a pressure not greater than $10^{-5}$ Torr.

This will now be described in more detail, taking the air flow in bearing assembly 30 as an example.

Almost all the air having been discharged from the bearing sleeve 2 is exhausted to the atmosphere outside the vacuum chamber 40 through the passageway B. However, a small amount of air does not flow into the passageway B but flows through the clearance between the partition 9 and the guide shaft 1 surface and then flows into the small space defined between the partitions 9 and 10. This is because the air reservoirs 7 and 8 are in communication with the atmosphere through the passageway B and the pressure within these reservoirs is approximately equal to the atmospheric pressure, such that the air in each of the reservoirs 7 and 8 is liable to flow into the interior of the chamber 40 where the pressure is low. However, it should be noted that retaining the air reservoir 7 (8) at a pressure approximately equal to the atmospheric pressure leads to production of such pressure distribution between the guide shaft 1 and the bearing sleeve 2 that is substantially the same as the pressure distribution which would be caused when the bearing assembly is placed in the atmosphere. Accordingly, it is possible to attain substantially the same rigidity (bearing rigidity) as attainable when the assembly is placed in the atmosphere. For this reason, retaining the air reservoir pressure substantially equal to the atmospheric pressure is preferable in the point of improving the performance of the bearing device.

Referring back to FIG. 1, almost all the air having been flown into the space between the partitions 9 and 10 is attracted by the vacuum pump 12, which may be a rotary pump, through the passageway C. At this time, a very small amount of air is not attracted by flows through the clearance between the partition 10 and the guide shaft 1 surface and then flows into the small space defined between the partitions 10 and 11. The air that flows into the space between the partitions 10 and 11 is attracted by the second vacuum pump 13, which may be a rotary pump, through the passageway D. At this time, however, only a very small portion of the air is not attracted but flows through the clearance between the partition 11 and the guide shaft 1 surface into the vacuum chamber 40. However, the amount of such air leakage is very small so that the leakage can be disregarded, and the vacuum chamber can be maintained at a high vacuum as described hereinbefore. It will be understood that the passageways C and D may be combined, at a midway, into one passageway so that one of the vacuum pumps 12 and 13 may be omitted.

The controller 25 is responsive to an instruction signal supplied thereto from a main controller (not shown) and controls the servovalves 18 and 18' to thereby control the pressures within the air chambers 14 and 14', respectively, by way of the air introducing ports 19 and 19' of the coupling barrel 4, so that a pressure difference is established between the air chambers 14 and 14'. By this pressure difference, the driving unit 20 which comprises the housings 3 and 3' and the coupling barrel 4 is displaced along the guide shaft 1. Similarly, the driving unit 20' is displaced along its guide shaft 1'. As a result, the coupling plates 6 and 6' are moved rectilinearly together with the workpiece carrying stage, not shown. At this time, a small portion of the air having been supplied into each air chamber 14 (14') flows through the clearance between the guide shaft 1 and an innermost partition 16 (16') formed on the housing 3 (3') and then leaks to the atmosphere through the corresponding passageway B (B'). Also, there is a leakage of air from the clearance between the flange 5 and the inner cylindrical surface of the coupling barrel 4 into the adjacent air chamber. However, such a clearance is very small, of an order of a few microns, so that there occurs only a limited amount of air leakage. Accordingly, the pressures within the air chambers 14 and 14' are not decreased significantly. Further, any pressure variation due to such air leakage is corrected in the driving mechanism of the present embodiment. Namely, the pressures within the air chambers 14 and 14' are detected by the pressure sensors 17 and 17', respectively, and in accordance with the result of sensing, the servovalves 18 and 18' are controlled under the influence of the controller 25 so that desired pressures are retained or established. Such servo control using the pressure sensors 17 and 17' and the servovalves 18 and 18' is effective to maintain desired pressures within the air chambers 14 and 14' of the coupling barrel 4, with the result that the position of the workpiece carrying stage can be held constant as desired and, additionally, the position of the workpiece carrying stage can be controlled precisely.

It will be readily understood that, in the present embodiment, the passageways A-E and A'-E' are arranged so that at least their portions disposed within the vacuum chamber 40 are arranged to follow the movement of the driving unit 20.

Figure 2:
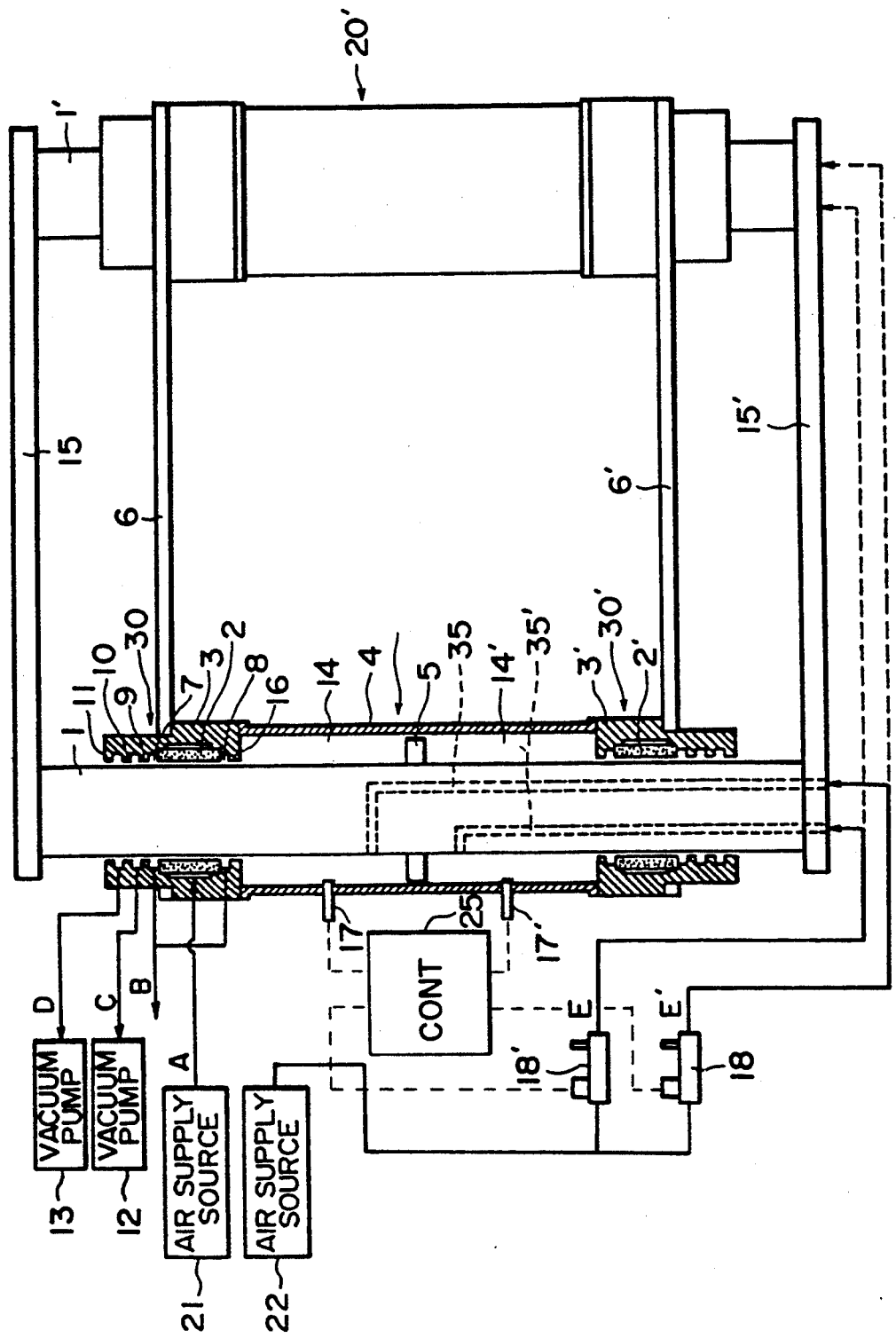
FIG. 2 is a schematic and diagrammatic view of a hydrostatic driving mechanism according to another embodiment of the present invention.

Referring now to FIG. 2, there is shown a driving mechanism according to another embodiment of the present invention. In this embodiment, air introducing passages 35 and 35' are formed inside a guide shaft 1. Each of the introducing passages 35 and 35' has an end thereof formed at an axial end face of the guide shaft 1. On the other hand, the other ends of the introducing passages 35 and 35' are formed so as to be open to air chambers 14 and 14' defined within a coupling barrel 4. The ends of the introducing passages 35 and 35', formed at the axial end face of the guide shaft 1, are made in fluid communication with servovalves 18 and 18', respectively, by means of passageways E and E', respectively. The air chambers 14 and 14' are supplied with airs as controlled by the servovalves 18 and 18', respectively, and flowing through the introducing passages 35 and 35', respectively, so that a pressure difference is established between the air chambers 14 and 14' whereby the driving unit 20 is displaced along the guide shaft 1. The remaining portion of the present embodiment is essentially the same as the corresponding portion of the foregoing embodiment. In FIG. 2, the same reference numerals as in the FIG. 1 embodiment are assigned to corresponding elements.

In the embodiment shown in FIG. 2, the pressure sensors 17 and 17' may be embedded in the guide shaft 1, in place of providing them on the coupling barrel 4, with their signal lines (wires) extending through the guide shaft 1 toward the outside of the chamber. Further, the FIG. 2 embodiment may be modified so that the partition means such as the flange 5 extends on and along a portion of the length of the guide shaft 1 while similar partition means such as a flange is provided on the coupling barrel 4. In such case, by introducing air pressures from the introducing passages 35 and 35' into two substantially separate and independent chambers defined by the partition means, the driving unit 20 can be displaced rotationally about the axis of the guide shaft 1.

While the invention has been described with reference to the structures disclosed herein, it is not confined to the details set forth and this application is intended to cover such modifications or changes as may come within the purposes of the improvements or the scope of the following claims.

What is claimed is:

1. A driving mechanism, comprising:
    a rod-like member having a flange;
    a cylindrical member for accommodating therein said rod-like member, said cylindrical member defining an interior space divided by said flange into two substantially independent spaces, wherein a clearance is defined between said cylindrical member and said flange;
    a gas bearing for discharging air and supporting without contact said cylindrical member and said rod-like member relative to each other;
    a bearing housing connected to said cylindrical member and accommodating therein said gas bearing, said bearing housing having gas reservoirs defined at opposite ends of said gas bearing and in communication with the outside of said bearing housing through passageways, said bearing housing further including a plurality of interior partition walls provided at an opposite side of said gas bearing from said cylindrical member and having a clearance between said rod-like member, wherein adjacent partition walls define an interspace therebetween into which a vacuum is applied; and
    driving means for moving one of said cylindrical member and said rod-like member relative to the other, said driving means supplying a driving gas to the interior space of said cylindrical member.

2. A mechanism according to claim 1, wherein said driving means includes a pressure gauge for measuring pressure in the interior space of said cylindrical member and a servo-controlled valve for controlling the supply of the driving gas into said cylindrical member.

3. A mechanism according to claim 1, wherein said driving means supplies the driving gas through a passageway defined in said rod-like member.

4. A mechanism according to claim 1, wherein said mechanism includes a pair of bearing housings, with each said bearing housing being disposed at an opposite end of said cylindrical member.

5. A mechanism according to claim 4, wherein said driving means includes a pressure gauge for measuring pressure in the interior space of said cylindrical member and a servo-controlled valve for controlling the supply of the driving gas into said cylindrical member.

6. A mechanism according to claim 4, wherein said driving means supplies the driving gas through a passageway defined in said rod-like member.

* * * * *

UNITED STATES PATENT AND TRADEMARK OFFICE
CERTIFICATE OF CORRECTION

PATENT NO. : 5,218,896
DATED : June 15, 1993
INVENTOR(S) : Furukawa

It is certified that error appears in the above-indentified patent and that said Letters Patent is hereby corrected as shown below:

COLUMN 1:

Line 14, "a" and "an" should be deleted.
Line 36, "an" should be deleted.

COLUMN 6:

Line 2, "airs as" should read --air--.

Signed and Sealed this

Twenty-sixth Day of April, 1994

Attest:

BRUCE LEHMAN

Attesting Officer       Commissioner of Patents and Trademarks